United States Patent Office 3,359,963
Patented Dec. 26, 1967

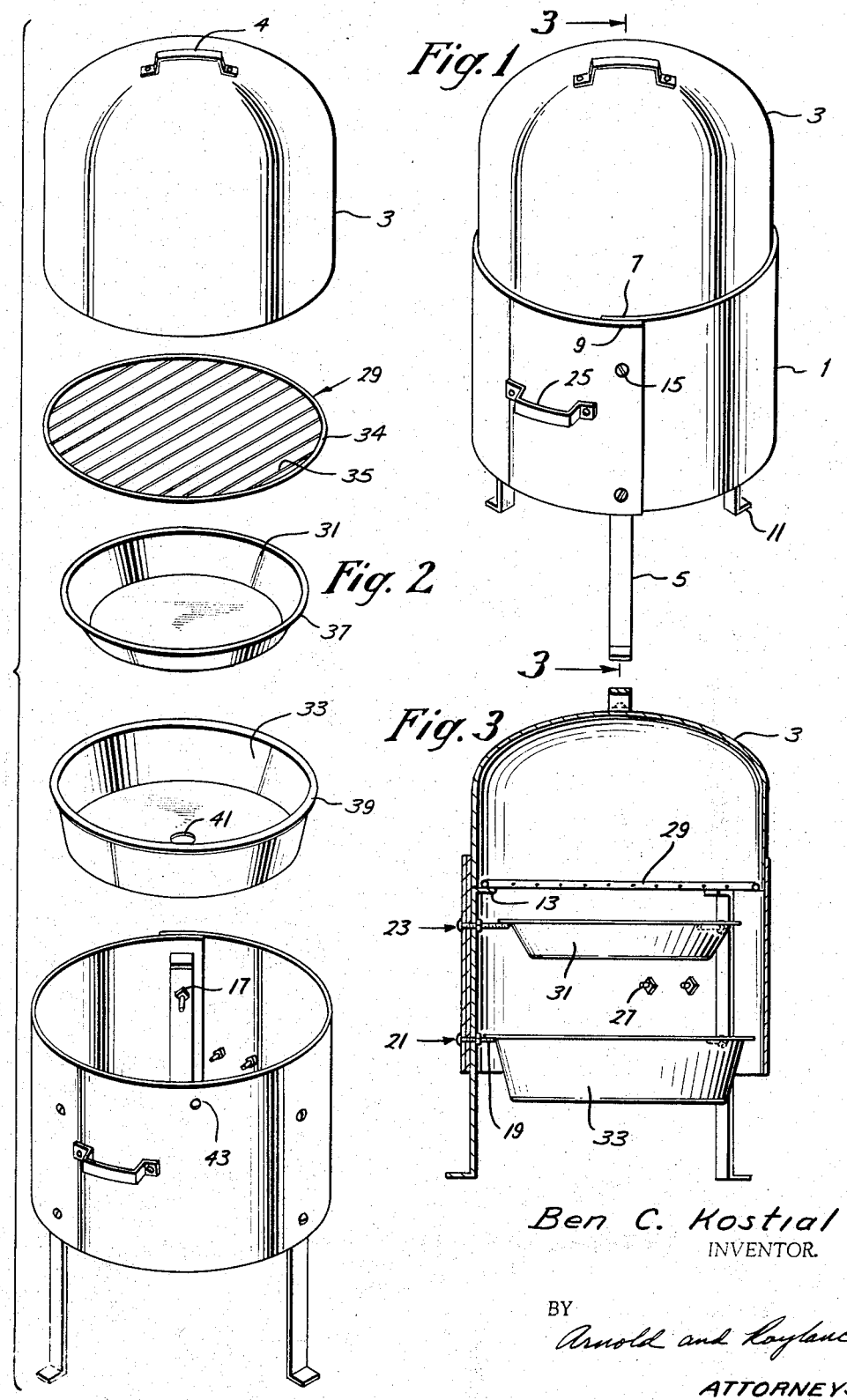

3,359,963
KNOCK-DOWN BROILING AND ROASTING APPARATUS
Ben C. Kostial, Houston, Tex., assignor to Texas National Manufacturing & Sales Company, Houston, Tex., a corporation of Texas
Filed Nov. 21, 1966, Ser. No. 595,810
6 Claims. (Cl. 126—9)

This invention relates to cooking apparatus and more particularly to a versatile apparatus suitable for cooking meats and other foods in a number of different ways.

Of course, small cookers primarily used for cooking out-of-doors and using charcoal as a fuel continue to enjoy a very high and increasing popularity. Although many of these are small and conveniently designed structures suitable for obtaining satisfactory results, demands are constantly being made for a cooking apparatus of simplified construction, but also capable of being used in a wide variety of ways to satisfy the desires of even the most exacting culinary hobbyist.

One very advantageous feature of the present invention is that it provides a compact apparatus which may be quickly assembled and disassembled and stored in an area that complies with even the very exacting size requirements of parcel post mailing and which, when assembled, provides a plurality of different arrangements for very versatile cooking. The construction is so simplified, however, that the apparatus may be constructed and sold at a very modest price, obviously yet another important and desirable advantage.

Generally, the apparatus described herein comprises a body formed into a cylinder by a metallic rectangular sheet, a plurality of bar-stock rectangular supporting legs removably fastened by screws (one supporting leg being secured to also secure together the overlapping ends of the sheet forming the cylindrical body), the screws also defining supporting planes within the cylindrical body, and a plurality of cooking elements (e.g., a grill, water pan, fuel pan) for hanging in place on the plurality of defined supporting planes during the various cooking operations that may be performed. A lid of convenient structure also may be included and handles may be attached to the body by screws defining yet additional supporting planes.

It is highly desirable that the apparatus when knocked down or disassembled be packageable in a size suitable for parcel post mailing. This may be done by making the pans stack together, the pans being small enough in diameter to fit within the lid and the lid being small enough to fit within the body such that the overall girth and length dimensions of the stored complete assembly can be boxed and still meet the parcel post mailing requirements.

In order that the advantages attained by the invention are better understood in detail, more particular description of the invention may be had by reference to the embodiment thereof which is illustrated in the appended drawings, which drawings form a part of this specification. It is to be noted, however, that the appended drawings illustrate only a typical embodiment of the invention and therefore are not to be considered limiting of its scope for the invention may admit to other equally effective embodiments.

In the drawings:

FIG. 1 is an isometric view of an overall assembled embodiment incorporating the invention.

FIG. 2 is an exploded view showing the various components of the embodiment shown in FIG. 1.

FIG. 3 is a vertical section taken at line 3—3 in FIG. 1.

Referring now to the drawings and first to FIG. 1, an embodiment of the present invention is shown generally comprising a body 1, a lid 3 and rectangular supporting legs 5.

The body member is most conveniently made from a heat-resistant metal sheet, such as iron, of generally rectangular shape. Fairly thin material on the order of one-eighth inch has been found to be acceptable. When formed into a cylinder to make the body member the inside end 7 of the sheet is overlapped by outside end 9.

The rectangular supporting legs may be formed most conveniently from rectangular bar stock, the lower end of each being turned outwardly to form a foot 11 and the upper end of the bar being turned inwardly to form a shelf 13 (as shown in FIG. 3). Bar stock having a cross-sectional dimension of one inch by one-quarter inch has been found to be acceptable.

As is shown in FIG. 2, two screws 15 passing through the body and through aligned holes in each supporting leg 15 are sufficient to keep the leg fixedly positioned with respect to the body and to keep it from rotating or sliding in place. Nuts 17 are used to hold screws 15 in place tightly to the body, although alternately, the receiving holes in legs 15 may be threadably tapped to receive and tighten screws 15 without the benefit of nuts. One leg 5 may be secured together with overlapping ends 7 and 9 of the body so that the screws securing the legs to the body also hold the body together and determine the peripheral or girth dimension thereof.

Assuming that the legs are all of uniform dimension and that the bends or turns are all made at the same respective locations therein, a natural radial plane of support for the hanging cooking elements is represented by shelves 13.

It should also be noted that if the corresponding holes through which the various screws are inserted to fasten the supporting members are placed in respective radial planes of the body and the screws are made sufficiently long so as to provide a supporting screw projection 19, additional planes are defined to support the hanging cooking elements of the assembly.

The fact that hanging plane of supports are defined may be shown by reference to FIG. 3, where planes are defined at 21 and 23 in such a manner. In addition, body handles 25 may be secured to body 1 via screws 27 similar to the attachment of legs 5, thereby providing additional planes of support.

The cooking elements of the apparatus may include, for example, grill 29, water pan 31 and fuel pan 33. Grill 29 is annularly shaped to conform with the general configuration of body 1, the outside circumference member 34 of the grill being made of circular rod stack, in conventional manner. Rods 35 span in secant fashion outside circumference member 34 at progressive locations and are secured thereto, such as by welding. Grill 29 provides a convenient holding means for meats and other foods during the various possible modes of cooking. It should be further noted that the outside dimension of grill 29 allows it to rest within body 1 and to be supported by the plane of support represented by shelves 13, the screw projections in plane 21, the screw projections in plane 23 or the plane defined by the projection of screws 27.

The water pan and the fuel pan each are of conventional design, the outside dimensions terminating in a lip 37 for water pan 31 and in lip 39 for fuel pan 33. The dimension represented by the lip diameter of each of these pans allows the respective pans to be supported on any of the defined planes of support previously mentioned. The width of the lip on water pan 31 may be greater than that on fuel pan 33 and the water holding portion thereof may be shallower and of smaller circumferential dimension than the fuel holding portion of fuel pan 33 to allow water pan 31 to be stacked within fuel pan 33 when the pans are being stored.

It should be further noted, that the outside diameter of lid 3 is of appropriate dimension to fit snugly inside body 1 and rest on the plane of support represented by shelves 13, the wall of the lid being sufficiently small (approximately one-quarter inch) so that grill 29 may easily rest on this same plane of support without coming into contact therewith.

Also, lid 3 of the described embodiment may have a handle 4 secured to the top thereof by any convenient means. Screws may be used, as with the securement of the supporting legs and body handles, but it has been found satisfactory to permanently affix the lid handle, such as by welding.

In operation, after the apparatus is assembled, the most complete cooking arrangement is the one shown in FIG. 3. In such an arrangement, fuel pan 33 is placed to rest on plane of support 21 at the bottom of the apparatus, the plane of support 21 being sufficiently vertically far removed from foot 11 that the bottom of the pan does not rest upon the ground. The prescribed amount of fuel is then placed in the fuel pan (typically five pounds of charcoal), careful consideration being given to leaving hole 41 in the bottom of the fuel pan at least partially free to allow a draft of air to move therethrough.

Next, water pan 31 is placed so that it is supported by plane of support 23. It should be noted that such an arrangement should leave the water pan unsupported by the fuel heaped up in pan 33. Water then is placed in water pan 23 to the desired level, which is normally full just short of overflowing. Next, grill 29 is placed on the plane of support represented by shelves 13 and the food to be cooked is placed thereon. Finally, lid 3 is placed down over grill 29 and supported by the plane of support represented by shelves 13.

Sufficient draft is provided through hole 41 from underneath the apparatus and vent 43 in the side wall of the body for the fuel to burn appropriately. The closeness of the lid and body, however, provide the food with a moist atmospheric cooking environment.

If it is desired to cook without the water pan, it may be removed and grill 29 either placed on the plane of support represented by shelves 13, on plane of support 23, or on the plane of support represented by screws 27. If it is desired to place the charcoal in closer proximity to water pan 23, either pan 23 may be lowered to the plane of support represented by screws 27 or fuel pan 33 may be raised to the plane of support represented by screws 27. Of course, cooking may be made with or without the lid, as desired.

When the unit is completely disassembled, as explained abovew, pan 31 fits snugly into pan 33 and all the legs and handles (with the possible exception of the lid handle), are detachable. The longitudinal dimension of the lid, including the handle, is made the same as or smaller than the longitudinal dimension of the body. Since the respective outside dimensions of the pans and grill are all less than the inside dimension of the lid, the disassembled unit allows for the stacking of the pans and the grill within the lid, which, in turn, may then be placed in the body.

Such an arrangement means that the outside girth dimension of the body represents the outside girth dimension of the disassembled unit. The legs may then be placed in a convenient second package. Of course, for ultimate compactness, the respective supporting legs may be made sufficiently short and apart from their respective shelves 13 (which shelves would then be separately secured to the body) such that the legs and shelves may also be packaged within the lid, the entire grouping of parts then being all together and within the confines defined by the body.

Current parcel post mailing regulations pertaining to maximum allowable size are to the effect that the combined girth dimensions of a package may not exceed 72 inches for packages mailed to first class post offices. Packaging the disassembled parts of the described embodiment of the invention in accordance with the above description provides a single unit that may be made sufficiently large for the cooking desires of the backyard hobbyist and still small enough to be properly packaged for mailing within the dimensions established for parcel post.

Also, the material used to make the described embodiment may be heavy enough to be long lasting and still easily be within the 20 pound weight limit established for parcel post mailing.

While only one embodiment of the invention has been described, it is obvious that various substitutes or modifications of structure may be made without varying from the scope of the invention.

What is claimed is:

1. A broiling and roasting apparatus for cooking food items comprising
    an annular, cylindrical body determined by a rectangular sheet, the ends of which overlap, said cylindrical body being open at either axial end,
    a plurality of rectangular supports,
    a plurality of screws for removably fastening said supports to said body, one of said supports being fastened to both overlapping ends of said body, thereby securing said ends together,
    said screws projecting radially inwardly within said body, thereby determining a radial plane of support,
    a radially inwardly projecting shelf secured to each of said supports, thereby determining a radial plane of support,
    an annular grill for the placement of food items having an outside dimension less than the inside dimension of said body and suitable for being supported by a radial plane of support,
    an annular fuel pan having an outside dimension less than the inside dimension of said body and suitable for being supported by a radial plane of support,
    an annular water pan having an outside dimension less than the inside dimension of said body and suitable for being supported by a radial plane of support, and
    an annular lid having an outside dimension less than the inside dimension of said body and suitable for being supported by the radial plane of support nearest the axial end of said body opposite said supports.

2. A broiling and roasting apparatus for cooking food items comprising
    an annular, cylindrical body determined by a rectangular sheet, the ends of which overlap, said cylindrical body being open at either axial end,
    a plurality of rectangular supports,
    a plurality of screws for removably fastening said supports to said body, one of said supports being fastened to both overlapping ends of said body, thereby securing said ends together,
    said screws projecting radially inwardly within said body, thereby determining radial planes of support,
    a radially inwardly projecting shelf secured to each of said supports, thereby determining a radial plane of support,
    an annular grill for the placement of food items having an outside dimension less than the inside dimension of said body and suitable for being supported by a radial plane of support, and
    an annular fuel pan having an outside dimension less than the inside dimension of said body and suitable for being supported by a radial plane of support.

3. A knock-down broiling and roasting apparatus for cooking food items, comprising
    an annular, cylindrical body determined by a rectangular sheet, the ends of which overlap, said cylindrical body being open at either axial end,
    a plurality of rectangular supports,
    a plurality of screws for removably fastening said supports to said body, one of said supports being fastened to both overlapping ends of said body, thereby securing said ends together, said screws projecting radially inwardly within said body, thereby determining radial planes of support, a radially inwardly projecting shelf secured to each of said supports, thereby determining a radial plane of support, an annular grill for the placement of food items having an outside dimension less than the inside dimension of said body and suitable for being supported by a radial plane of support, an annular fuel pan having an outside dimension less than the inside dimension of said body and suitable for being supported by a radial plane of support, an annular water pan having an outside dimension less than the inside dimension of said body and suitable for being supported by a radial plane of support, an annular lid having an outside dimension less than the inside dimension of said body and suitable for being supported by the radial plane of support nearest the axial end of said body opposite said supports, said pans dimensionally suitable for stacking and having an outside dimension less than the internal dimension of said lid to allow for storage therein, said longitudinal dimension of said lid being no greater than the longitudinal dimension of said body to allow for storage therein when said internally projecting screws are unfastened and said supports are disassembled therefrom.

4. A knock-down broiling and roasting apparatus in accordance with claim 3, wherein said longitudinal dimension of said body and said storage lid are within the minimum allowed for delivery by parcel post.

5. A broiling and roasting apparatus for cooking food items, comprising an annular, cylindrical body determined by a rectangular sheet, the ends of which overlap, said cylindrical body being open at either axial end, a plurality of rectangular supports, a plurality of screws for removably fastening said supports to said body, one of said supports being fastened to both overlapping ends of said body, thereby securing said ends together, said screws projecting radially inwardly within said body, thereby determining a radial plane of support, an annular grill for the placement of food items having an outside dimension less than the inside dimension of said body and suitable for being supported by a radial plane of support, an annular fuel pan having an outside dimension less than the inside dimension of said body and suitable for being supported by a radial plane of support, an annular water pan having an outside dimension less than the inside dimension of said body and suitable for being supported by a radial plane of support, and an annular lid having an outside dimension less than the inside dimension of said body and suitable for being supported by the radial plane of support nearest the axial end of said body opposite said supports.

6. A broiling and roasting apparatus in accordance with claim 5, and including a plurality of radially inwardly projecting shelves, each of said shelves being removably secured to said body and determining a radial plane of support.

References Cited

UNITED STATES PATENTS

| 1,298,762 | 4/1919 | Milligan | 126—25 |
| 1,321,678 | 11/1919 | Skinner | 126—9 X |
| 2,786,463 | 3/1957 | Vincent | 126—25 |
| 3,049,071 | 8/1962 | Diack | 126—25 X |

FREDERICK L. MATTESON, JR., *Primary Examiner.*

E. G. FAVORS, *Assistant Examiner.*